United States Patent
Syré et al.

(10) Patent No.: US 6,918,672 B2
(45) Date of Patent: Jul. 19, 2005

(54) ARRANGEMENT FOR ROTATABLE ADJUSTMENT OF A CAP ON AN EYEPIECE HOUSING

(75) Inventors: Philipp Syré, Linden (DE); Alfred Hengst, Lahnau (DE)

(73) Assignee: Leica Camera AG, Solms (DE)

(*) Notice: Subject to any disclaimer, the term of this patent is extended or adjusted under 35 U.S.C. 154(b) by 0 days.

(21) Appl. No.: 10/827,334

(22) Filed: Apr. 20, 2004

(65) Prior Publication Data

US 2004/0196554 A1 Oct. 7, 2004

Related U.S. Application Data

(62) Division of application No. 10/217,462, filed on Aug. 14, 2002, now Pat. No. 6,779,899.

(30) Foreign Application Priority Data

Aug. 16, 2001 (DE) .......................................... 101 39 173

(51) Int. Cl.[7] .................................................. G02B 7/00
(52) U.S. Cl. ......................... 359/511; 359/510; 359/600
(58) Field of Search ................................ 359/511, 510, 359/600–612, 700–702, 407–425, 506–509

(56) References Cited

U.S. PATENT DOCUMENTS

| 4,346,967 A | * | 8/1982 | Komoto et al. ............. 359/705 |
| 4,380,378 A | | 4/1983 | Tamura |
| 4,428,651 A | | 1/1984 | Calcutt |
| 4,523,818 A | | 6/1985 | Lang et al. |
| 4,576,446 A | | 3/1986 | Kamata |
| 5,212,595 A | | 5/1993 | Dennison, Jr. et al. |
| 5,784,207 A | | 7/1998 | Satoh |
| 6,280,040 B1 | * | 8/2001 | Koide ......................... 359/600 |
| 6,412,958 B2 | | 7/2002 | Aikawa |
| 6,574,056 B2 | | 6/2003 | Ishikawa et al. |

FOREIGN PATENT DOCUMENTS

DE   299 04 366 U1   7/1999

* cited by examiner

Primary Examiner—Mohammad Sikder
(74) Attorney, Agent, or Firm—Foley & Lardner LLP

(57) ABSTRACT

An arrangement for rotatable adjustment of a cap on an eyepiece housing with a stationary pin pointing radially outward from the eyepiece housing and a groove which is assigned to the pin, arranged on the inner side of the cap and rises in the axial direction, is characterized in that, in a plane at right angles to the longitudinal axis of the eyepiece housing, three pins are arranged on the latter, the heads of which pins have at least approximately the same spacing from the longitudinal axis, and in that the sliding bottom of the groove assigned to each pin has a smaller spacing in relation thereto, so that the cap bears against the pins under prestress.

34 Claims, 1 Drawing Sheet

ARRANGEMENT FOR ROTATABLE ADJUSTMENT OF A CAP ON AN EYEPIECE HOUSING

The present application is a divisional of U.S. application Ser. No. 10/217,462, filed Aug. 14, 2002, now U.S. Pat. No. 6,779,899, the entire contents of which are incorporated herein by reference.

CROSS-REFERENCE TO RELATED PATENT APPLICATIONS

This application claims benefit of and priority to Federal Republic of Germany Priority Application 101 39 173.0, filed Aug. 16, 2001 including the specification, drawings, claims and abstract, which is incorporated herein by reference in its entirety.

The invention relates to an arrangement for rotatable adjustment of a cap on an eyepiece housing with a stationary pin pointing radially outward from the eyepiece housing and a groove which is assigned to the pin, arranged on the inner side of the cap and rises in the axial direction.

BACKGROUND OF THE INVENTION

An arrangement of this type is known from U.S. Pat. No. 5,784,207 What is known as an eyepiece cup is arranged longitudinally displaceably on an eyepiece housing, in order for it to be possible for glasses-wearers and normal-sighted observers to set an optimum position of the eye in relation to the exit pupil of the eyepiece. A screw is attached to the eyepiece housing, the head of which is guided in a groove which is in the inner wall of the eyepiece cup. By rotating the eyepiece cup, the height of the eyepiece cup is adjusted relative to the eyepiece housing. Provided opposite the groove-guide in the cross section of the arrangement, between the eyepiece cup and the eyepiece housing, is a catch arrangement for different extension positions of the eyepiece cup. The catch arrangement consists of a plate spring element which is provided with a nose and is arranged on the eyepiece housing, the nose engaging in appropriately shaped notches in the inner wall of the eyepiece cup.

The large number of parts makes assembly more difficult and is expensive. The resilience of the catching element wears out as a result of material fatigue. Demounting of the eyepiece cup for cleaning purposes is not envisaged.

An eyepiece housing with an adjustable, in particular asymmetrically shaped eyepiece cup is known from DE 299 04 366 U1. A guide, which likewise consists of a groove and a pin, is intended to ensure that the eyepiece cup is stopped in the displacement end positions concerned and always has the same orientation in the circumferential direction. To this end, catching positions are provided, which are arranged on a line parallel to the longitudinal axis of the eyepiece housing. As the guide groove is inclined in relation to the longitudinal axis, its direction always has to be diverted, in relation to the designated line parallel to the longitudinal axis, for passage into the catching position. The catching is brought about by an angular change in direction of the guide groove.

While it is true that this guide manages without additional moving parts, it nevertheless requires a relatively complex shape of the guide tracks, which can wear at the angular diversions to the catch position when used for a relatively long time. Demounting of the eyepiece cup is not envisaged in this case either.

It is therefore an object of the invention to provide a simple and cost-effective fastening, guidance and catching arrangement for an eyepiece cup to be adjusted rotatably on an eyepiece housing, which manages with only one moving mechanical component which is non-sensitive to environmental influences and, for cleaning, can be removed from the eyepiece housing, cleaned and replaced rapidly and without additional tools.

SUMMARY OF THE INVENTION

According to the invention, this object is achieved in an arrangement of the type referred to in the introduction by virtue of the characterizing features of the invention.

In one embodiment of the invention, there is an arrangement for rotatable adjustment of a cap on an eyepiece housing with a stationary pin pointing radially outward from the eyepiece housing and a groove which is assigned to the pin, arranged on the inner side of the cap and rises in the axial direction, wherein, in a plane at right angles to the longitudinal axis (4) of the eyepiece housing (10), three pins (11) are arranged on the latter, the heads of which pins have at least approximately the same spacing from the longitudinal axis (4), and wherein the sliding bottom (7) of the groove (3) assigned to each pin (11) has a smaller spacing in relation thereto, so that the cap (1) bears against the pins (11) under prestress.

In another embodiment of the invention, there is an arrangement for rotatable adjustment of a cap on an eyepiece housing wherein the grooves (3) have catching recesses (8, 8', 8") in their sliding bottom (7), the shape of which recesses is adapted to the heads of the pins (11) and the depth of which recesses is selected in such a way that, in the catching positions, the cap (1) bears against the pins (11) under a prestress which is reduced in relation to the position on the sliding bottom (7).

In another embodiment of the invention, there is an arrangement for rotatable adjustment of a cap on an eyepiece housing wherein the undersize of the sliding bottom (7) in relation to the head of the pin (11) is 1.0% to 2.0%, and the corresponding undersize of the catching recesses (8, 8', 8") is 0.01% to 0.9% of the spacing of the head from the longitudinal axis (4).

In another embodiment of the invention, there is an arrangement for rotatable adjustment of a cap on an eyepiece housing wherein the grooves (3) are, in their part (6) located next to the lower edge (5) of the cap (1), angled in the opposite direction to the axial incline, and are open at the lower edge (5) of the cap (1).

In another embodiment of the invention, there is an arrangement for rotatable adjustment of a cap on an eyepiece housing wherein the delimitation (9) of the grooves (3) running out at an acute angle in relation to the lower edge (5) of the cap (1) is milled off parallel to the longitudinal axis (4).

In another embodiment of the invention, there is an arrangement for rotatable adjustment of a cap on an eyepiece housing wherein the grooves (3) have a catching recess (8) in the corner of the angle.

In another embodiment of the invention, there is an arrangement for rotatable adjustment of a cap on an eyepiece housing wherein the heads of the pins (11) are spherically shaped.

In another embodiment of the invention, there is an arrangement for rotatable adjustment of a cap on an eyepiece housing wherein the heads of the pins (11) are spherically polished.

In another embodiment of the invention, there is an arrangement for rotatable adjustment of a cap on an eyepiece housing wherein the cap (1) comprises an abrasion-resistant, elastically deformable plastic with a low coefficient of thermal expansion.

In another embodiment of the invention, there is an arrangement for rotatable adjustment of a cap on an eyepiece housing wherein the cap (1) comprises a glass-fiber-reinforced polycarbonate.

In another embodiment of the invention, there is an arrangement for rotatable adjustment of a cap on an eyepiece housing wherein the cap (1) is provided with a removable cover (2) made of an elastomeric material.

BRIEF DESCRIPTION OF THE DRAWINGS

Illustrative embodiments are shown diagrammatically in the drawings and are described in greater detail below with reference to the figures, in which, in detail.

DESCRIPTION OF THE PREFERRED EMBODIMENTS

Figure 1:
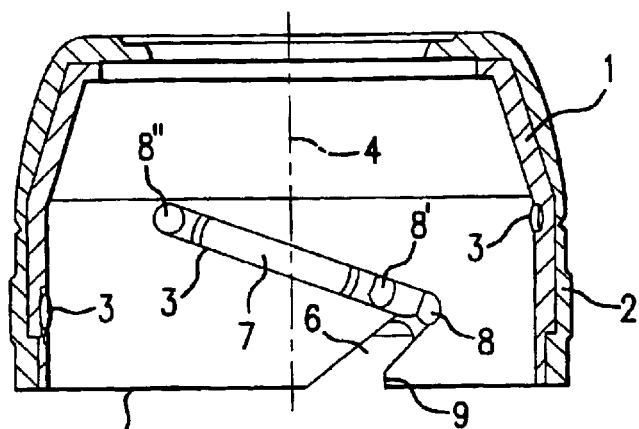
FIG. 1 shows a longitudinal section through the cap.

FIG. 1 shows a cap 1, onto which an elastomeric cover 2, for example, is pulled. For cleaning, the cover 2 can, by virtue of its elasticity, be easily removed from the cap 1 and pulled back on again. It serves in particular for soft contact against a glasses lens or against the eye socket of the observer.

The cap 1 comprises three grooves 3 which are offset symmetrically in its cylindrical inner wall and are inclined in relation to the longitudinal axis 4 of the arrangement. That end 6 of the groove 3 located next to the lower edge 5 of the cap 1 is angled in the opposite direction to the inclination of the groove 3 and is open toward the edge 5. Let into the sliding bottom 7 of the groove 3 are local recesses 8, 8', 8" which serve for catching. The catching recess 8 is located in the corner of the angle of the groove 3. This catching position corresponds to the most raised cap position.

By milling off the delimitation 9 of the groove 3, which runs out at an acute angle in relation to the lower edge 5 of the cap 1, parallel to the longitudinal axis 4, an enlarged opening of the groove 3 at the lower edge 5 of the cap 1 is produced.

Figure 2:
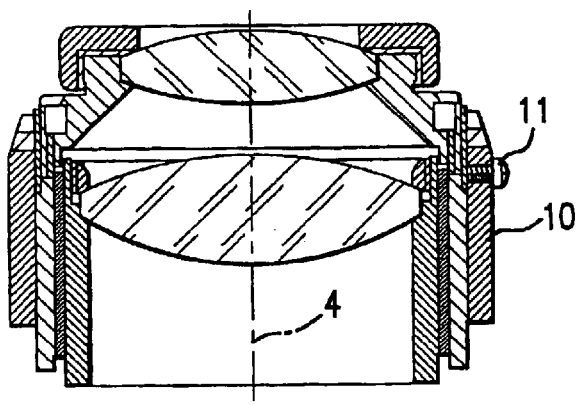
FIG. 2 shows a longitudinal section through the eyepiece housing.

FIG. 2 illustrates an eyepiece housing 10 to which radially outwardly pointing pins 11 are attached. For assembly, the cap 1 is put onto the eyepiece housing 10 and perhaps rotated slightly, the pins 11 sliding into the enlarged openings of the grooves 3. As the diameter of the cap 1 in the region of the sliding bottom 7 of the grooves 3 is smaller than the corresponding diameter of the circumscribed circle containing the heads of the pins 11, the cap 1 has to be pushed onto the pins 11 under slight pressure. The undersize of the sliding bottom 7 in relation to the respective pin 11 is preferably 1.0% to 2.0% of the spacing of the head from the longitudinal axis 4, and the corresponding undersize of the catching recesses 8, 8', 8" is preferably 0.01% to 0.9% of the spacing of the head from the longitudinal axis 4.

Figure 3:
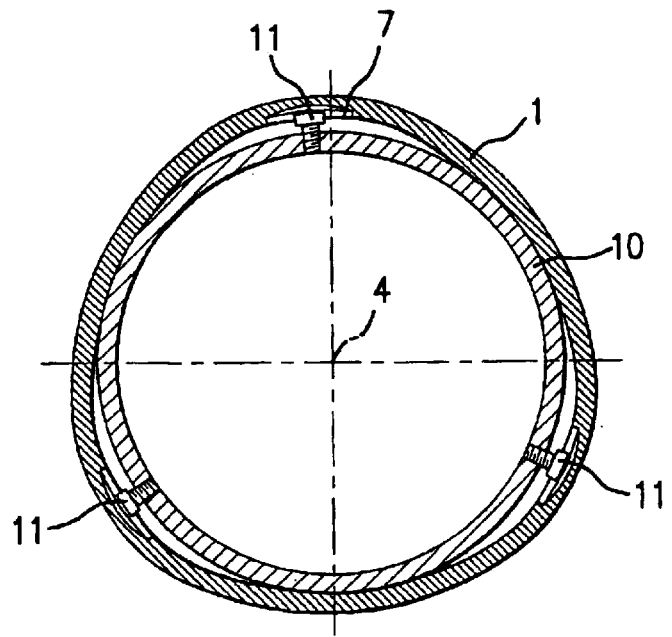
FIG. 3 shows a cross section of the arrangement in the assembled state.

As can be seen from FIG. 3, the cap 1 is deformed in cross section to form a circular triangle when pushed onto the sliding tracks 7 of the grooves 3. In this connection, the illustration in FIG. 3 is exaggerated to provide a better view. The heads of the pins 11 therefore slide on the sliding bottom 7 of the grooves 3 under prestress generated by the cap 1 by deformation.

Further rotation counterclockwise brings the cap 1 into the first catching position 8. While it is true in this connection that the prestress is relieved slightly, it nevertheless continues to ensure play-free catching of the cap 1 owing to the undersize which exists. In the first catching position 8, further rotation counterclockwise is not possible. Of course, the grooves 3 can be configured so that the cap is moved into the first catching position by clockwise rotation.

On clockwise rotation, the cap 1 is first brought out of the catching recess 8 counter to the catching resistance and it then screws itself further and further onto the eyepiece housing 10 until the next catching recess 8' and then the final catching recess 8" is reached.

To release the cap 1 from the eyepiece housing 10, the cap 1 merely has to be brought into the catching recess 8. Then, a pull on the cap 1 with subsequent rotation clockwise is sufficient for it to be possible to remove the cap 1. The change in the direction of rotation therefore constitutes a safeguard against unintentional removal of the cap 1. Of course, the grooves 3 can be configured so that the cap is removed with a subsequent rotation counter-clockwise.

The cap 1 is preferably made from an abrasion-resistant, elastically deformable plastic with a low coefficient of thermal expansion. Since the heads of the pins 11 slide in the grooves 3 under prestress and also have to be pressed out of the catching recesses 8, 8', 8" counter to the prestress, an abrasion-resistant material lengthens the lifetime of the arrangement. A spherical, in particular spherically polished surface of the heads of the pins 11 is advantageous in terms of lifetime and sliding comfort on adjustment of the cap 1. As the eyepiece cups, in particular on telescopes, are frequently exposed to extreme temperature variations, it is important, for maintaining the prestress generated by deformation, that this prestress is not reduced appreciably by thermal expansion. A glass-fiber-reinforced polycarbonate has been found to be especially suitable with regard to the two desired characteristics.

What is claimed is:

1. An arrangement for rotatable adjustment of a cap on an eyepiece housing comprising:
    at least three stationary pins pointing radially outward from the eyepiece housing; and
    at least three grooves, each of which is assigned to a pin, arranged on the inner side of the cap and rising in the axial direction; wherein
    the three pins are arranged on the eyepiece housing in a plane at right angles to the longitudinal axis of the eyepiece housing, the heads of the pins having at least approximately the same spacing from the longitudinal axis, and wherein
    sliding bottoms of the grooves assigned to each pin have a smaller spacing in relation thereto, so that the cap bears against the pins under prestress.

2. The arrangement as claimed in claim 1, wherein the grooves have catching recesses through their sliding bottoms, the shape of recesses being adapted to the heads of the pins and the depth of the recesses being such that, in catching positions, the cap bears against the pins under a prestress which is reduced in relation to the position on the sliding bottom.

3. The arrangement as claimed in claim 2, wherein an undersize of the sliding bottom in relation to the head of the pin is 1.0% to 2.0% of the spacing of the head from the longitudinal axis, and the corresponding undersize of the catching recesses is 0.01% to 0.9% of the spacing of the head from the longitudinal axis.

4. The arrangement as claimed in claim 1, wherein a part of each of the grooves located next to a lower edge of the cap is angled in the opposite direction to the axial incline and is open at the lower edge of the cap.

5. The arrangement as claimed in claim 4, wherein delimitation of the grooves running out at an acute angle in relation to the lower edge of the cap is milled off parallel to the longitudinal axis.

6. The arrangement as claimed in claim 4, wherein the grooves have catching recesses in their sliding bottoms, the shape of recesses being adapted to the heads of the pins and the depth of the recesses being such that, in catching positions, the cap bears against the pins under a prestress which is reduced in relation to the position on the sliding bottom, and wherein the grooves have a catching recess in the corner of the angle.

7. The arrangement as claimed in claim 1, wherein the heads of the pins are spherically shaped.

8. The arrangement as claimed in claim 7, wherein the heads of the pins are spherically polished.

9. The arrangement as claimed in claim 1, wherein the cap comprises an abrasion-resistant, elastically deformable plastic with a low coefficient of thermal expansion.

10. The arrangement as claimed in claim 9, wherein the cap comprises a glass-fiber-reinforced polycarbonate.

11. The arrangement as claimed in claim 1, wherein the cap is provided with a removable cover made of an elastomeric material.

12. An arrangement for rotatable adjustment of a cap on an eyepiece housing comprising:
 an eyepiece housing having at least three protrusions aligned radially outward from the eyepiece housing and being stationary with respect to the housing; and
 a cap having at least three grooves respectively associated with the at least three protrusions when the cap is operationally positioned on the eyepiece housing, wherein the grooves are arranged on an inner side of the cap, and wherein the groves have at least a portion that is angled in the circumferential direction; wherein
 the at least three protrusions are arranged on the housing such that the at least three protrusions each have a portion that lies substantially in a plane normal to the longitudinal axis of the eyepiece housing, wherein
 outward ends of each of the at least three protrusions have approximately the same spacing from the longitudinal axis, and wherein
 the at least three glooves associated with the at least three protrusions have a sliding bottom having a spacing, when the cap is not operationally positioned on the eyepiece housing, in relation to the longitudinal axis of the housing that is smaller than the spacing of the outward ends of the protrusions in relation to the longitudinal axis of the housing.

13. The arrangement as claimed in claim 12, wherein the protrusions are pins.

14. The arrangement as claimed in claim 13, wherein the pins have heads which are located furthest from the longitudinal axis of the housing.

15. The arrangement as claimed in claim 12, wherein the grooves have catching recesses in the sliding bottoms, wherein the shapes of the recesses are adapted to interface with the protrusions, wherein the depths of the recesses are dimensioned in such a way that when the protrusions interface with the recesses, the cap bears against the protrusions under a force which is reduced in relation to when the protrusions interface with a portion of a sliding bottom other than a recess.

16. The arrangement as claimed in claim 15, wherein the undersize of the sliding bottom in relation to the end of the protrusion is about 1.0% to about 2.0% of the spacing of the head from the longitudinal axis, and the corresponding undersize of the catching recesses is about 0.01% to about 0.9% of the spacing of the ends of the protrusions to the longitudinal axis.

17. The arrangement as claimed in claim 12, wherein at least a portion of each of the grooves are located next to a lower edge of the cap and is open at the lower edge of the cap, and wherein the portion located next to the lower edge of the cap is angled in an opposite direction with respect to the first angled portion.

18. The arrangement as claimed in claim 17, wherein the portion of the cap located near the lower edge and forming a portion of the groove which forms one leg of an acute angle in relation to the lower edge is chamfered.

19. The arrangement as claimed in claim 17, wherein the portions of the grooves that are oppositely angled with respect to the longitudinal axis meet, wherein the grooves have catching recesses in the sliding bottoms, wherein the shapes of the recesses are adapted to interface with the protrusions, wherein the depths of the recesses are dimensioned in such a way that when the protrusions interface with the recesses, the cap bears against the protrusions under a force which is reduced in relation to when the protrusions interface with a portion of a sliding bottom other than a recess, and wherein a recess is located at the meeting points of the angled grooves.

20. The arrangement as claimed in claim 12, wherein at least a portion of each of the protrusions are spherically shaped.

21. The arrangement as claimed in claim 20, wherein at least a portion of each of the protrusions are spherically polished.

22. The arrangement as claimed in claim 12, wherein the cap comprises an abrasion-resistant, elastically deformable plastic with a low coefficient of thermal expansion.

23. The arrangement as claimed in claim 22, wherein the cap comprises a glass-fiber-reinforced polycarbonate.

24. The arrangement as claimed in claim 12, wherein the cap is provided with a removable cover made of an elastomeric material.

25. The arrangement of claim 12, wherein:
 the grooves have catching recesses in the sliding bottoms, wherein the shapes of the recesses are adapted to interface with the protrusions, wherein the depths of the recesses are dimensioned in such a way that when the protrusions interface with the recesses, the cap bears against the protrusions under a force which is reduced in relation to when the protrusions interface with a portion of a sliding bottom other than a recess;
 the undersize of the sliding bottom in relation to the end of the protrusion is about 1.0% to about 2.0% of the spacing of the ends of the protrusions to the longitudinal axis, and the corresponding undersize of the catching recesses is about 0.01% to about 0.9% of the spacing of the ends of the protrusions to the longitudinal axis; and
 at least a portion of each of the grooves are located next to a lower edge of the cap and is open at the lower edge of the cap, and wherein the portion located next to the lower edge of the cap is angled in an opposite direction with respect to the first angled portion.

26. The arrangement of claim 25, wherein a recess is located at a meeting point of the angled grooves.

27. The arrangement of claim 26, wherein at least two additional recesses are located in the first angled portion.

28. A cap for an eyepiece housing comprising:

a cap adapted to fit around an eyepiece housing, wherein the eyepiece housing has at least three protrusions aligned radially outward from the eyepiece housing and being stationary with respect to the housing, wherein the at least three protrusions are arranged on the housing such that at least three protrusions each have a portion that lies substantially in a plane normal to the longitudinal axis of the eyepiece housing, and wherein the outward ends of each of the at least three protrusions have approximately the same spacing from the longitudinal axis; wherein the cap has at least three grooves adapted to respectively associate with at least three protrusions on the housing when the cap is operationally positioned on the eyepiece housing, wherein the grooves are arranged on an inner side of the cap, wherein the groves have at least a portion that is angled in the axial direction, and wherein the at least three grooves adapted to associate with at least three protrusions have a sliding bottom having a radial spacing that is smaller than the radial spacing of the outward ends of the protrusions when the cap is not operationally positioned on the eyepiece housing.

29. An eyepiece housing arrangement comprising:

an eyepiece housing having at least three protrusions aligned radially outward from the eyepiece housing and being stationary with respect to the housing, the housing adapted to accept a cap having at least three grooves adapted to respectively associate with at least three protrusions on the eyepiece housing when the cap is operationally positioned on the eyepiece housing, wherein the grooves of the cap are arranged on an inner side of the cap, and wherein the grooves have at least a portion that is angled in the circumferential direction; wherein the at least three protrusions associating with the cap are arranged on the housing such that the at least three protrusions each have a portion that lies substantially in a plane normal to the longitudinal axis of the eyepiece housing, and wherein outward ends of each of the at least three protrusions have approximately the same spacing from the longitudinal axis.

30. A microscope, telescope, camera, binoculars, or monocular having an eyepiece housing, the improvement comprising an arrangement according to claim 1.

31. A microscope, telescope, camera, binoculars, or monocular having an eyepiece housing, the improvement comprising an arrangement according to claim 12.

32. A microscope, telescope, camera, binoculars, or monocular having an eyepiece housing, the improvement comprising an arrangement according to claim 25.

33. A microscope, telescope, camera, binoculars, or monocular having an eyepiece housing, the improvement comprising an arrangement according to claim 26.

34. A microscope, telescope, camera, binoculars, or monocular having an eyepiece housing, the improvement comprising an arrangement according to claim 27.

* * * * *